Figure 1:
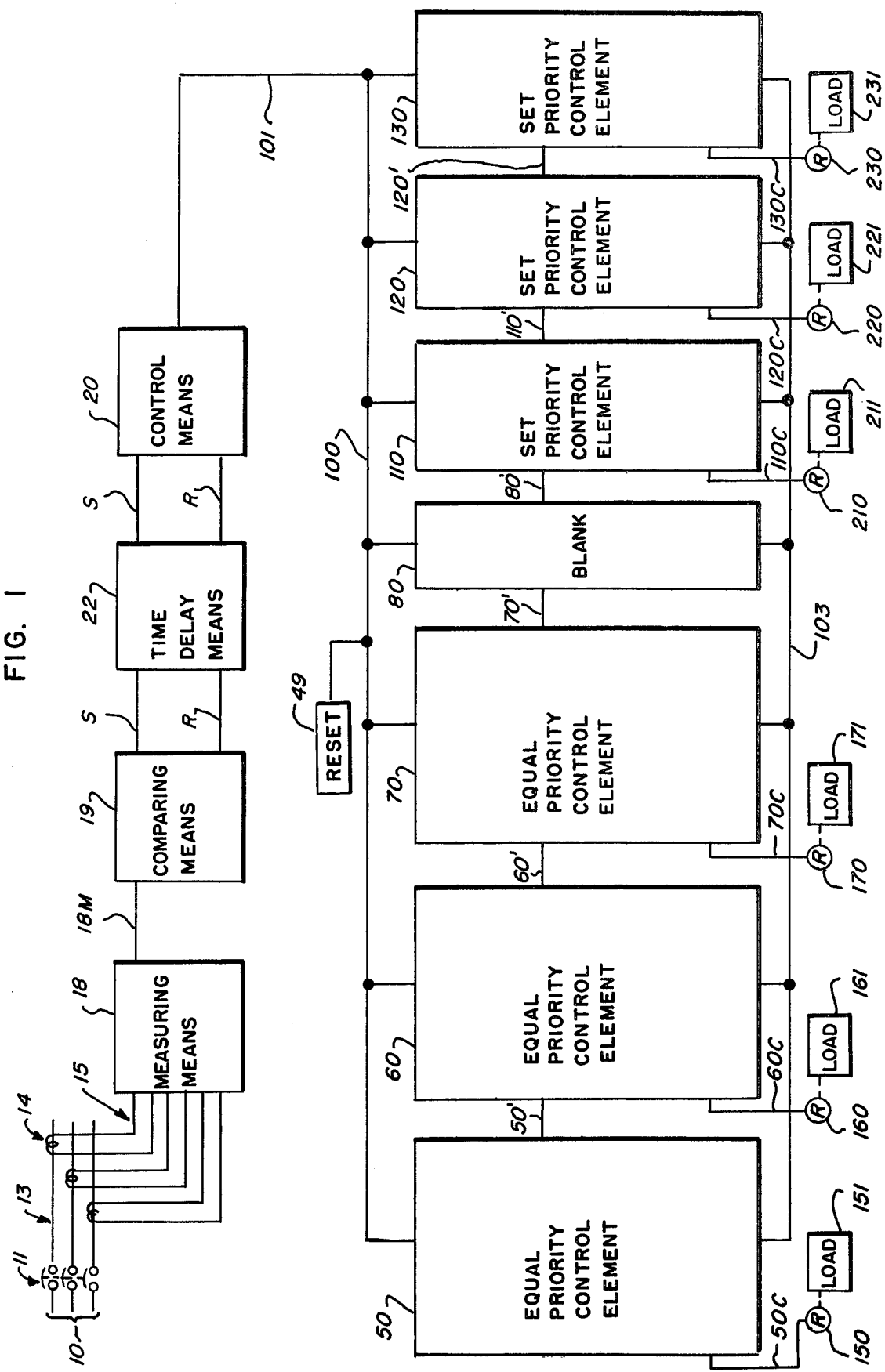

United States Patent [19]

Baranowski et al.

[11] 4,100,426
[45] Jul. 11, 1978

[54] LOAD CONTROLLING MEANS

[75] Inventors: Stephen W. Baranowski, Fairfield, Conn.; Richard H. McConeghy, Milwaukee, Wis.

[73] Assignee: Square D Company, Park Ridge, Ill.

[21] Appl. No.: 665,655

[22] Filed: Mar. 10, 1976

[51] Int. Cl.² .................... H02J 3/00; H02J 3/14
[52] U.S. Cl. .................... 307/41; 307/35; 307/42; 307/52
[58] Field of Search ............ 307/35, 38, 40, 41, 307/42, 52, 57

[56] References Cited

U.S. PATENT DOCUMENTS

| 3,339,079 | 8/1967 | Kessler | 307/41 |
|---|---|---|---|
| 3,439,181 | 4/1969 | Goitiandia et al. | 307/38 |
| 3,529,173 | 9/1970 | Verma | 307/41 |
| 3,538,391 | 11/1970 | Bensley et al. | 307/41 |
| 3,566,147 | 2/1971 | Masreliez | 307/39 |
| 3,588,518 | 6/1971 | Wavre | 307/38 |
| 3,787,729 | 1/1974 | Bennett | 307/41 |
| 3,881,114 | 4/1975 | Ferrari | 307/41 |

FOREIGN PATENT DOCUMENTS

| 843,617 | 6/1970 | Canada | 307/38 |
|---|---|---|---|

Primary Examiner—Robert K. Schaefer
Assistant Examiner—Eugene S. Indyk
Attorney, Agent, or Firm—Roger J. Falkowski; Michael J. Femal

[57] ABSTRACT

A demand controller for connecting and disconnecting loads from a power source has a plurality of control elements in two priority groups, an equal priority group and a set priority group. Loads are controlled by the control elements to be connected and disconnected. A control means directs signals for restoring and shedding the loads and for the priority between the two groups of control elements.

7 Claims, 4 Drawing Figures

LOAD CONTROLLING MEANS

This application relates to load control systems, particularly to demand control systems that connect and disconnect loads from an electrical source in response to a measure of the total current consumed by the loads.

In many industrial and commercial installations electrical loads powered by the incoming electrical utility power source can be used under various conditions for different intervals and therefore savings in power use can be achieved by controlling the period of operation. Also, utility charges are often set so that excessive peak power consumption results in increased rates. Accordingly, in many installations it is desirable to limit peak load conditions by providing a device that connects and disconnects loads as the total power consumption varies.

Devices used to accomplish this function are often called demand controllers and generally are of the type that senses the level of current being used and connects loads when the current drops below a preselected level and disconnects loads when the current rises above another preselected level. In this manner the maximum desirable number of loads are connected at all times and the load demand is kept below excessive levels either to limit peak load assessment or to even out load peaks and thereby reduce total consumption.

Demand controllers generally connect and disconnect loads under some priority system in a permanently wired installation. Relays control respective loads and a control system activates and deactivates the relays in response to a restore load condition or a shed load condition as they occur. Prior art demand controllers, however, are not particularly flexible and do not provide for more than one type of priority switching sequence.

With this invention a new and improved demand controlling means uses modular construction that enables plug-in units to be used to control any number of loads and provides for a selection of priority systems for groups of loads. A demand controller according to this invention can be manufactured as a standard package and any selected number of plug-in modules, one for each load, can be used to control the loads present in any particular installation. The controller also can establish two priority systems so that two groups of loads may be connected and disconnected in different sequences depending on the needs of the particular installation. A selective priority system for connecting and disconnecting loads is desirable since some loads are considered of equal importance and can be turned on and off in the same sequence while others may have comparatively different importance and are preferably turned on and off in a different sequence.

Other advantages and objects of this invention will be apparent from the following description.

Figure 2:
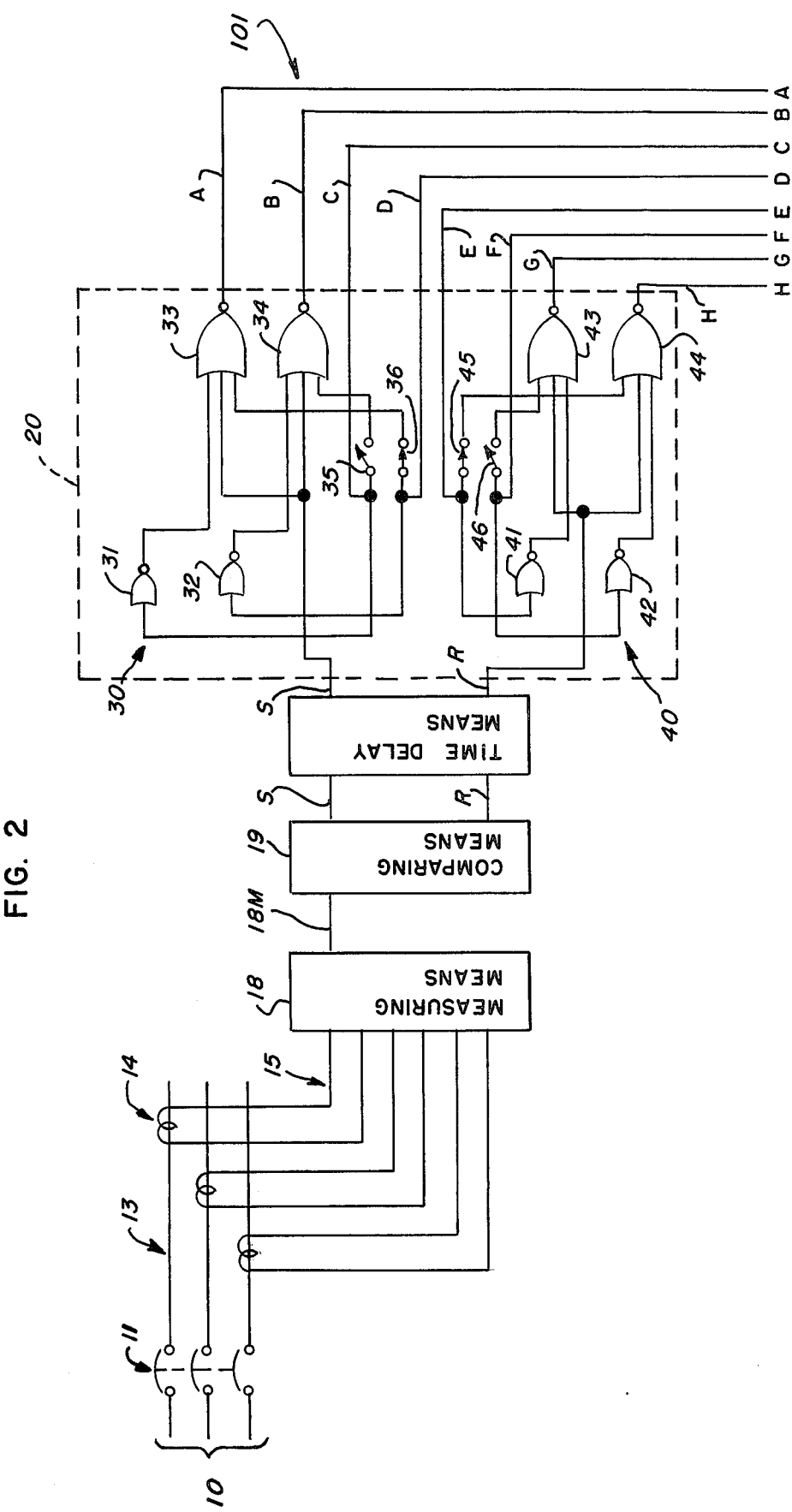
Figure 3:
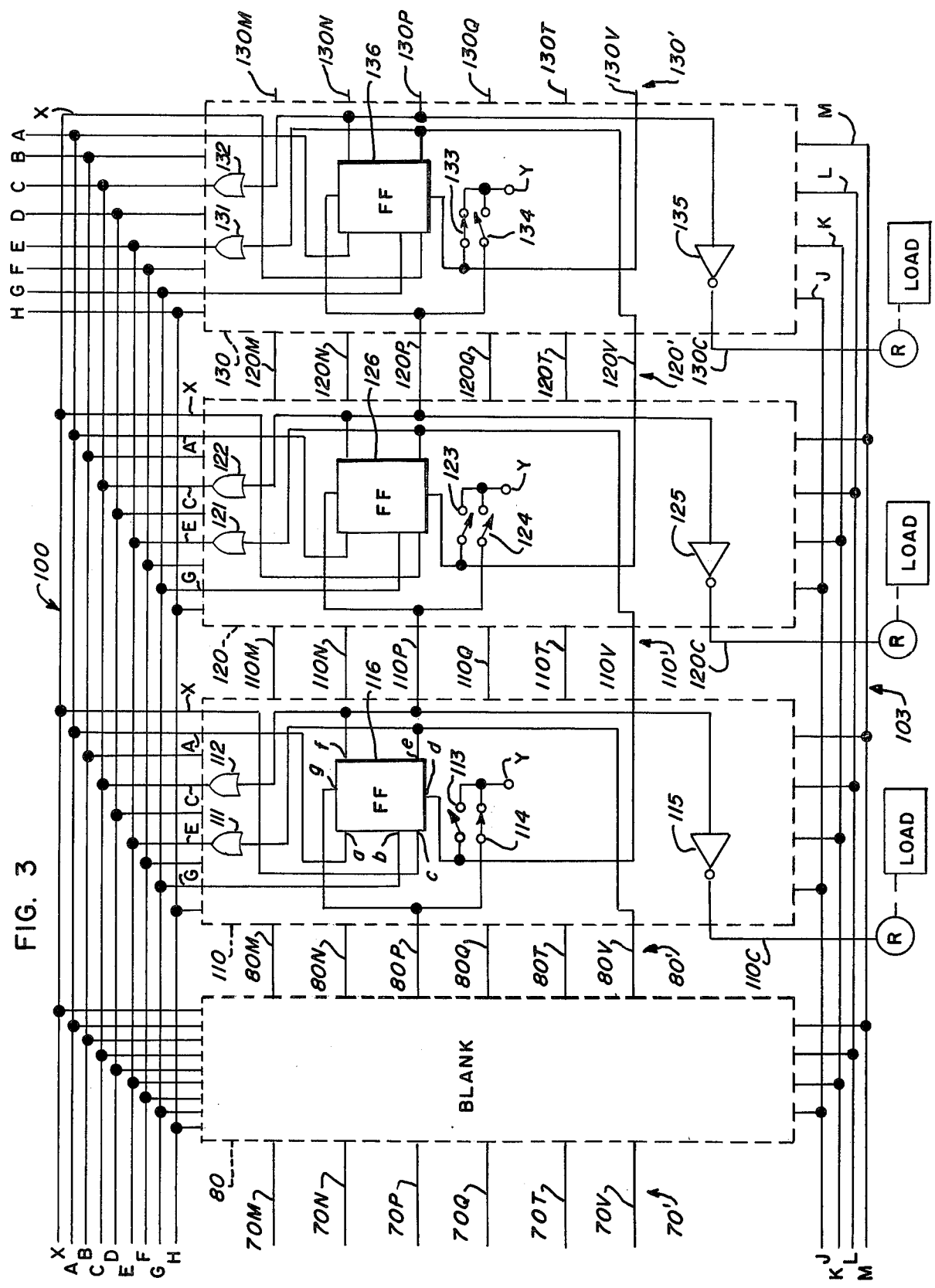
Figure 4:
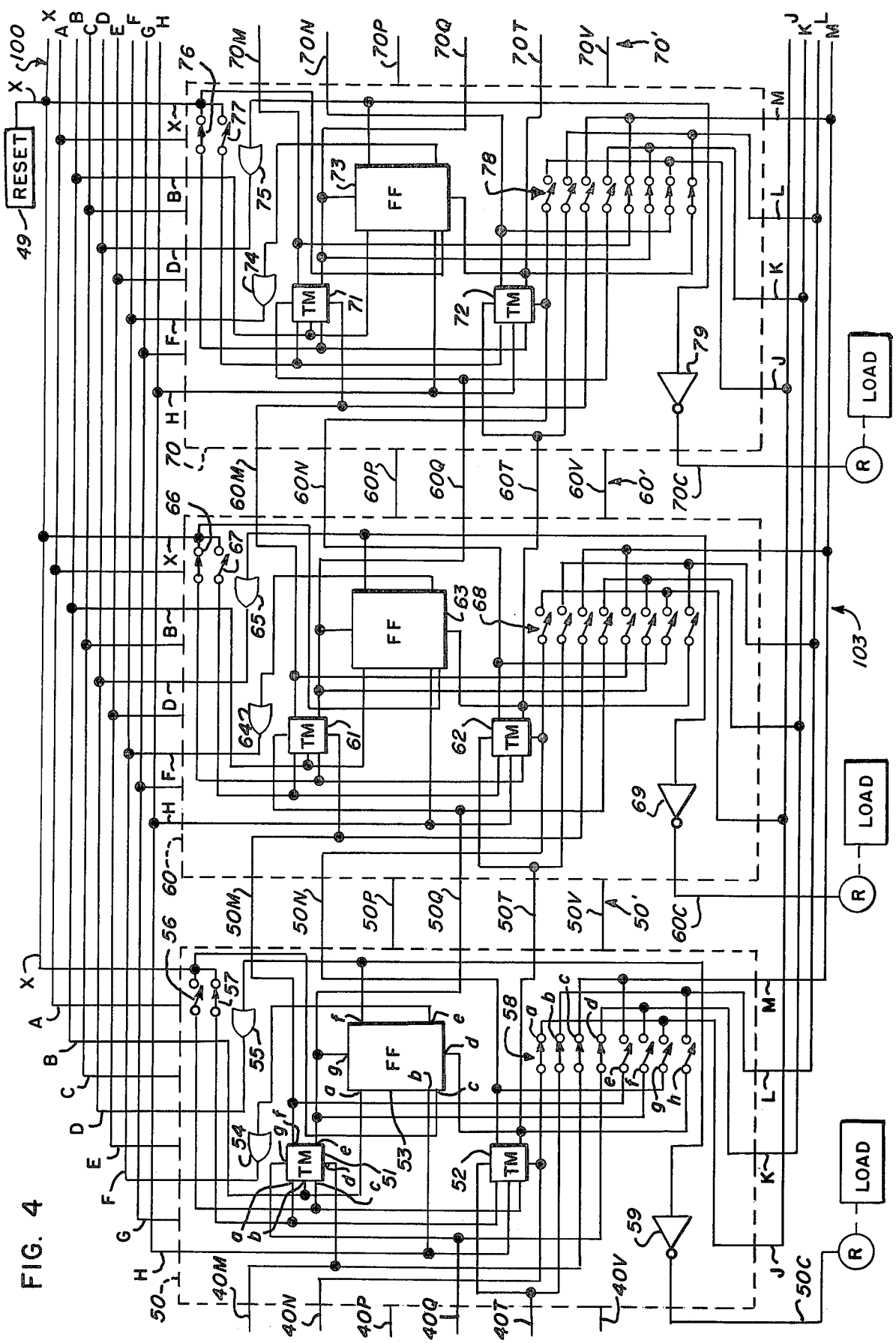

FIG. 1 is a general block diagram and simplified mechanical representation of a demand controller system according to this invention; and FIGS. 2, 3 and 4 are each a part of the demand controller shown in FIG. 1 in more detail.

Referring to FIG. 1, a demand controller that can be used in any general, industrial or commercial installation is connected to a power source, such as an alternating current three phase power source 10, which is connected in any known manner (not shown) to power loads 151, 161, 171, 211, 221 and 231 through a service entrance breaker 11 and through current transformers 14 that are connected to measure the current in each of the three phases in any known manner. A sensing means 12 for producing after a preselected time delay a first output signal when the current is above a first preselected level and a second output signal when the current is below a second preselected level comprises measuring means 18 for producing an output varying as a function of the total current in the power system, a comparing means 19 for producing the first and second output signal, and a time delay means for delaying the output signals. The measuring means converts the output of the current transformers received along lines 15 to a direct current that varies as a function of the total current through the current transformers and applies its output along line 18M to comparing means 19.

The comparing means produces a first output signal, or shed signal, along line S when the measuring means output is above the first preselected level, and a second output signal, or restore signal, along line R when the measuring means output is below the second preselected level. Comparing means 19 may be of any type known in the art that compares an input to a preselected reference to produce two respective outputs, one when the input is above the reference by a selected amount and the other when the signal is below the reference by a selected amount.

The signals from the comparing means are received by time delay means 22 which produces the corresponding shed output signals and restore output signals along lines S and R, respectively after preselected time delays in any manner known in the art. Two time delay functions are used as known in the art. A first time delay of short duration functions to prevent production of a shed or restore signal in response to a momentary or transient condition on the power system. A second time delay between consecutive shed or restore signals delays the output for a selected time interval to permit the current conditions to stabilize after switching has occurred. These time intervals are selected for particular characteristics and types of loads encountered in any particular installation.

The output of the sensing means, either a shed or restore output signal, is applied to a control means 20 for producing control signals for the priority groups.

The control means output is connected by a multiple conductor 100 to a first priority group having a plurality of equal priority control elements 50, 60 and 70 and to a second priority group having a plurality of set priority control elements 110, 120 and 130. The two priority groups control the corresponding loads through each of the control elements along respective control lines 50C, 60C, 70C, 110C, 120C and 130C to control relays 150, 160, 170, 210, 220 and 230. The control relays respectively control loads 151, 161, 171, 211, 221 and 231 in any manner known in the art.

The system is shown schematically and with a physical or mechanical relationship. The control elements are plug-in modules of any type known in the art that plug into receptacles. A plurality of adjacent receptacles corresponding to the control element positions as shown receive the modules. The plugging in of a control element module to a backboard of conductors including multiple conductor groups 100 and 103 connected to all receptacles and multiple conductor groups 50', 60', 70', 80', 110' and 120' connected between juxtaposed receptacles.

The equal priority control elements operate to turn the loads on and off in sequence with the first load turned on being the first one turned off and the first turned off being the first turned on. For example, if all the loads are connected to the source by control elements 50, 60 and 70, upon the receipt of a shed signal by the euqal priority group, one of the loads, for example load 151, would be disconnected. Upon the next shed signal load 161 would be disconnected. At this point, upon the occurrence of a restore signal, control element 50 would operate to connect load 151. Upon the occurrence of a further shed signal, control element 70 would operate to disconnect load 171 and so on.

With respect to the set priority group, upon the input of a shed signal with all the loads connected, control element 110 would disconnect load 211 which would be followed by load 221. Occurrence of a restore signal at this point would operate control element 120 to reconnect load 221 and so on.

Control means 20 comprises a means for selecting delivery of its output to select the priority between the two systems and would typically be operated so that all the loads of the equal priority group would be disconnected before any loads of the set priority group would be disconnected and all the set priority loads would be connected before any equal priority loads would be connected.

Referring to FIGS. 2, 3 and 4 showing the details of the system in FIG. 1, control elements 50, 60, 70, 110, 120 and 130 are shown schematically and physically in a generalized manner to illustrate the wiring. The control elements are a group of plug-in modules or boards, an equal priority board and a set priority board, respectively, having mechanical connections of any known type that upon insertion of the board make the connections shown to interconnecting multiple conductor 100, interconnecting multiple conductor 103, and interconnecting conductors 40′, 50′, 60′, 70′, 80′, 110′, 120′ and 130′ connected between each of the respective boards. The backboard of any suitable panel is designed in any known manner to receive any selected number of modules with each module pluggable into the groups of conductors to make the connections schematically. To separate the two priority groups a blank space 80 is left between the two priority groups to break the interconnecting conductors between juxtaposed receptacles.

The control means is connected to the priority boards through multiple conductor 101 which has eight conductors, A through H. The priority boards are interconnected through multiple conductor 100 which has nine conductors, A through H plus X, and through multiple conductor 103 which has four conductors, J, K, L and M.

Referring particularly to FIG. 2, control means 20 comprises a means 40 for connecting or restoring loads and a means 30 for disconnecting or shedding loads. The means for disconnecting loads produces an output at line A to the set priority group for shedding loads in the set priority group and an output at line B to the equal priority group for shedding loads in the equal priority group with line C receiving an input indicating the condition of the loads controlled by the set priority group and line D receiving an input indicating the condition of the loads controlled by the equal priority group.

Means for shedding loads 30 comprises a NOR circuit, or inverter, 31, a NOR circuit, or inverter, 32, control NOR gates 33 and 34, and a means for selecting shed priority between the two priority groups that comprises a switch 35 and a switch 36.

Similarly means for restoring loads 40 comprises a NOR circuit, or inverter, 41, a NOR circuit, or inverter, 42, control NOR gates 43 and 44, and a means for selecting restore priority between the two priority groups that comprises a switch 45 and a switch 46.

The control means functions in response to the receipt of shed and restore signals and to inputs from the priority groups. The various conditions for the logic of the system are as follows. Considering the shedding procedure, the shed output along line S from the time delay means is normally at a high level, referred to hereinafter as one, and upon production of a shed signal, a pulse, momentarily changes from a one to a zero condition to produce a zero pulse as an input along line S to NOR gates 33 and 34. The inputs from the priority groups are such that line C is at one whenever any set priority load is connected and line D is at one whenever any equal priority load is connected. Switch 36 is closed so that the input along line D is directly applied as an input to NOR gate 33 and switch 35 is open so that line C is not connected as an input to NOR gate 34, thus maintaining that input at zero. Thus, when both line C and line D are at one a blocking signal is applied to the one of the NOR inputs of the NOR gates 33 and 34 selected by the positioning of switches 35 and 36. At the same time the inputs along lines C and D are inverted to enable the corresponding NOR gates when at one and disable them when at zero.

Thus with lines C and D at one a shed signal switches only NOR gate 34 to produce an output pulse, zero to one to zero, along line B to the equal priority group. When all the equal priority loads are disconnected, line D is at zero which enables NOR gate 33 and disables NOR gate 34. The next shed pulses will then be applied through NOR gate 33 along line A to the set priority group until all the set priority loads are disconnected.

The control means operates in the same manner for restoring loads. The inputs along lines E and F from the two priority groups are at one whenever any load of its respective priority group is disconnected. Switches 45 and 46 are positioned so that as long as a load is disconnected in the set priority group the input along line E will be at one and will block or disable NOR gate 44, which controls the equal priority group along line H, and enable NOR gate 43 through inverter 41. Upon the occurrence of a restore pulse, which operates in the same manner as the shed pulse, that is, it goes from a one to a zero and returns to one, a pulse will be sent by NOR gate 43 along line G to connect the next load in the set priority group.

When all the loads of the set priority group are connected, line E changes to zero and this through inverter 41 blocks NOR gate 43 and enables NOR gate 44 through switch 45. As long as the equal priority group input along line F is at a one, indicating that at least one load is not connected, the input to NOR gate 44 will be at zero and NOR gate 44 will produce a pulse upon the occurrence of a restore signal until all the loads in the equal priority group are connected.

Thus the control operates by shedding all the loads in the equal priority group first and by restoring all the loads in the set priority group first. The control elements receive the inputs from the control means along the back wiring group, or interconnecting conductors. Interconnections are also made between the priority boards along a second back wiring group, or interconnecting conductors, 103 and connections are made between juxtaposed boards of the same priority group by back wiring groups, or interconnecting conductors, 50, 60, 110 and 120. Blank space 80 breaks the connections between the receptacles for control elements 70 and 110 so that back wiring groups 70' and 80' are terminating points. If no additional control elements are used, back wiring groups 40' and 130' are also terminating points.

Each control element produces an output that controls a respective control relay with control elements 50, 60, 70, 110, 120 and 130 each controlling control relays 150, 160, 170, 210, 220 and 230, respectively. Each of the control relays controls its corresponding loads 151, 161, 171, 211, 221 and 231, respectively, in any manner known in the art. The logic of the system as shown is that energization of a control relay occurs when the corresponding control line, lines 50C, 60C, 70C, 110C, 120C and 130C, is in a one condition. The load control contact is a normally closed function so that when the relay is energized the respective load is disconnected from the source. In this manner a failure of the demand controller system automatically connects all the loads to the source.

Referring to FIG. 4, equal priority control element 50 comprises transfer memories 51 and 52, a flip-flop circuit 53, or gates 54 and 55, reset switches 56 and 57, a multiple control switch 58, and an inverting amplifier 59.

Transfer memory 51, and the other similar transfer memories 52, 61, 62, 71 and 73, is a known device that produces a set of complementary outputs and has a set input $a$, a reset input $c$, a control input $b$, a first output $f$ and a first enabling input $g$ for the first output, and a second output $e$, which is the complement of the first output, and a second enabling input $d$ for the second output. The set and reset inputs are controlling so that upon a set input, i.e., a one pulse, the first output will be changed to a one, thus switching the second output to a zero, regardless of any of the conditions of the other inputs. Similarly, upon a reset input of a one pulse the second output will be changed to a one, and the first output to zero, regardless of any of the conditions of the other inputs. The enabling inputs control the memory so that a change in the condition of the transfer memory will occur only if an enabling input and its corresponding output are at zero.

Flip-flop circuit 53, and the other similar flip-flop circuits 63 and 73, is a standard device known in the art that produces a set of complementary outputs and a first input $a$, a second input $b$, a reset input $c$, a first output $f$, a first enabling input $g$, a second output $e$, the complement of the first output, and a second enabling input $d$. The circuit is of any type known in the art that changes the outputs only when a zero going pulse is received at an input and the corresponding enabling input is at a zero. The output of flip-flop circuit 53 are applied to the control means through OR gates 54 and 55, respectively, and to control relay 150 through inverting amplifier 59 along line 50C.

Reset switches 56 and 57 are positioned in the reset line and determine the sequence for starting of the system. Switch 58 makes the appropriate return connections from the last to the first control element through interconnecting conductors 103.

Equal priority control elements are interconnected through back connections 50' and 60'. Elements 60 and 70 are the same as control element 50 and corresponding last digits of identifying numbers are used to indicate corresponding components.

Referring to FIG. 3, set priority control element, or board 110, comprises a flip-flop circuit 116, OR gates 111 and 112, connecting switches 113 and 114, and an inverting amplifier 115. Flip-flop circuit 116, and the corresponding flip-flop circuits 126 and 136 in the other control elements, is of the same type as flip-flop circuits 53, 63 and 73 in the equal priority control elements and has a first input $a$, a second input $b$, a reset input $c$, a first output $f$, a first enabling input $g$, a second output $e$, the complement of the first output, and a second enabling input $d$. The outputs of flip-flop circuit 116 are applied to the control means through OR gates 111 and 112, respectively, and to control relay 210 through power inverter 115 along line 110C.

Set priority control elements 120 and 130 are the same as control element 110 and corresponding last digits of identifying numbers are used to indicate corresponding components. The set priority control elements are interconnected through back connections 110' and 120'. Switches 113 and 114, and corresponding switches in control elements 120 and 130, select the set priority sequence.

In the operation of the circuitry shown, upon initial energization of the demand controller and associated power system a reset control 49 of any known type produces an initial pulse, going to one, along line X to each of the control elements. This operates to disconnect all the loads so that the demand controller system can begin operating to restore the loads one by one until the selected restore signal level, or current, is exceeded. The off or reset pulse is applied along line X to the transfer memories in the equal priority control elements and to the flip-flop circuits in all the control elements. For purposes of simplifying the description the first output of any of the transfer memories or flip-flop circuits will be referred to in discussing the state of the flip-flop circuits with an "on" condition meaning that the first output is on, or in a one condition, and the second output is off, or in a zero condition.

The reset pulse along line X is applied through the reset switches of each control element. In control element 50, switch 56 is open and switch 57 is closed to apply the pulse to set input $a$ of transfer memories 51 and 52 to turn them on. Control elements 60 and 70 have switches 66 and 67 and 76 and 77 positioned oppositely to switches 56 and 57 and this applies the reset pulse to reset input $c$ of transfer memories 61, 62, 71 and 72 to turn them off. The reset pulse is also applied to the reset inputs $c$ of flip-flop circuits 53, 63, 73, 116, 126 and 136 to turn them off. This applies a zero input to the respective inverting amplifiers and a one input to the respective control relays. This energizes the control relays to break the normally closed contacts and disconnect all the loads.

Under the conditions occurring immediately after the reset pulse with all the loads disconnected, the demand controller system, after the selected time delay in the time delay means and if the current level of the loads is low enough, will produce a restore pulse to control means 20 which will produce a one pulse along line G. This occurs because lines E and F are at one (the off condition of the flip-flop circuits) and this blocks NOR gate 44 and enables NOR gate 43 to respond to the restore pulse.

The pulse along line G is received by the set priority group, and received at the second input $b$ of the flip-flop circuit. Switches 113, 114, 123, 124, 133 and 134 in control elements 110, 120 and 130 are positioned so that the enabling input *d* of only flip-flop circuit 136 is connected to zero, or enabling, point Y so that only flip-flop circuit 136 will respond to the pulse. The enabling inputs *d* of flip-flop circuits 116 and 126 are connected to the second outputs *e* of flip-flop circuits 126 and 136, respectively, which are at a one condition, through lines 110V and 120V, respectively and therefore are not enabled. The restore pulse therefore turns on flip-flop circuit 136 which de-energizes control relay 230 and connects load 231 to the load. The change in flip-flop circuit 136 changes input *d* of flip-flop circuit 126 along line 120V from second output *e* of flip-flop circuit 136.

Upon occurrence of the next restore pulse after the selected interval provided by the time delay means, if the current being drawn by the entire load system has not reached the selected level, flip-flop circuit 126 will be turned on, load 221 will be connected to the load, and the second enabling input *d* of flip-flop circuit 116 will go to zero and be enabled. The next restore pulse similarly will turn on flip-flop circuit 116 and connect load 211 to the source. This places all the set priority flip-flop circuits in an off condition which changes the condition of line E to a zero thereby disabling NOR gate 43 and enabling NOR gate 44 in the control means. Subsequent restore pulses will subsequently be applied to the equal priority group.

The next restore pulse is applied along line H to the equal priority group. The restore pulse is received by all three flip-flop circuits 53, 63 and 73 in control elements 50, 60 and 70, respectively as an input to their second inputs *b*. Flip-flop circuits 63 and 73 do not change because their second enabling inputs *d* are at a one condition since they are respectively connected to the second outputs *e* of transfer memories 62 and 72 which are in an off condition. Transfer memory 52, however, was placed in an on condition by the reset pulse which applies a zero to enabling input *d* and enables the second output of flip-flop circuit 53 which is accordingly turned on. First output *f* goes to one and line 50C goes to zero to de-energize control relay 150 and connect load 151 to source 10.

The restore pulses are also applied to input *b* of the restore transfer memories. Since transfer memory 52 has its second enabling input at zero, from first output *f* of transfer memory 72 which is off, and its second output at zero, since it is turned on, the restore pulse will turn off transfer memory 52. Similarly transfer memory 62 has its first enabling input *g* and its first output *f* at zero and is turned on by the restore pulse. Transfer memory 72 remains in an off condition since its first enabling input *g* is one and its second output *f* is at one.

Upon the receipt of a second restore pulse, flip-flop circuit 63 will be turned on to connect load 161 to the source. Transfer memory 62 will change condition to change first enabling input *d* of flip-flop circuit 73 and thereby place flip-flop circuit 73 in an enabled condition for the receipt of the next restore pulse.

Upon receipt of the next restore pulse flip-flop circuit 73 is turned on to de-energize control relay 170 and connect load 171 to the source.

Upon the change in output condition of flip-flop circuit 73 all the flip-flop circuits are turned on and the input along line F to the control means is changed so that both NOR gates 43 and 44 are in a blocked condition.

With the reverse operation of shedding loads, upon production of a shed pulse, the control means and control elements operate in the same general manner in the reverse direction to disconnect the loads. Assuming that the loads have all just been energized in the sequence discussed, the first shed pulse will be applied because of the blocked condition of NOR gate 33, since line D is at one, to the equal priority group along line B. The restore pulse will turn off transfer memory 51 and turn off flip-flop circuit 53 thereby energizing control relay 150 and disconnecting load 151 from the source. This also changes transfer memory 61 and applies a zero to first output *f* of flip-flop circuit 63 for receipt of the next shed signal. Upon receipt of the next shed signal flip-flop circuit 63 is turned off to disconnect load 161 from the source, change transfer memory 73 and to set up flip-flop circuit 73 for receipt of the next restore pulse.

If at this point, when loads 151 and 161 are disconnected in the sequence just described, a restore pulse would turn on flip-flop circuit 53 in control element 50 which has been enabled by the change of condition of transfer memory 52 upon the turning on of the load controlled by control element 60 during the restore operation. The sequencing follows in the same manner in both shed and restore operation by setting up the next control element for either a shed or restore operation. The first one on is always the first one turned off.

Upon receipt of the next shed pulse equal priority control element 70 operates to disconnect load 171 from the source and this changes the condition of the input along line D to the control means since all the flip-flop circuits 53, 63 and 73 are turned off. This prevents further shed pulses from being applied to the equal priority group.

The set priority group receives the next shed signal along line A since NOR gate 33 is now enabled with line D being at zero. In control element 110 flip-flop circuit 116 is enabled for being turned on because its first enabling input *g* is connected to common connection Y, which is at zero, by switch 114, while the other flip-flop circuits 126 and 136 are not enabled for turning on because their first enabling inputs *g* are connected to the first output of the preceeding flip-flop circuit, i.e., 126g to 136g to 126e, which are at one.

After flip-flop circuit 116 is turned, first enabling input *g* of flip-flop circuit 126 is placed at zero and the next shed pulse will turn on flip-flop circuit 126 and connect load 221 to the source. Similarly, a further shed pulse will operate on flip-flop circuit 136 which is now enabled for turning on and connect load 231 to the source.

If a restore pulse appears, the last load in the set priority group to disconnect would be connected. In this manner the set priority system connects the loads in a selected order of importance.

The use of empty socket 80 between the two priority groups provides a means by which a plug-in system can use any number of control elements in each priority group. In the set priority control elements the appropriate common connection is made by setting switches 113 and 114, 123 and 124 and 133 and 134 so that the start of the switching in the group can be established for the shed and restore functions. The connections between the control elements 110 and 120 are made through conductors 110P; and 110V, between elements 120 and 130 through conductors 120P and 120V, and with corresponding conductors if additional control elements are used. It is only necessary to close switch 114 in the first board and switch 133 in the last board with all the corresponding switches in the intermediate boards set in an open position.

The equal priority control elements use switches 58, 68 and 78 to make the proper backboard connections. It is only necessary upon installation to close contacts 58a, 58b, 58c and 58d in the first control element and close contacts 78e, 78f, 78g and 78h in the last control element. The contacts in switches in any intermediate boards, such as switch 68, are left open. The connections between the adjacent control elements are made by conductors 50M, 50N, 50Q and 50T and 60M, 60N, 60Q and 60T, corresponding to connections between other control elements if used.

We claim:

1. A demand controller for an electrical power system of the type connecting and disconnecting electrical loads from an electrical source to control the level of electrical power consumption comprising:

a sensing means responsive to the current in the power system for producing a first output signal when the current is above a first preselected level for a preselected time and a second output signal when the current is below a second preselected level for a preselected time;

a first group of control elements each connected to respectively control each of a first group of loads and having a means responsive to control signals for connecting and disconnecting its loads in a preselected first priority sequence;

a second group of control elements each connected to respectively control each of a second group of loads and having a means responsive to control signals for connecting and disconnecting its loads in a preselected second priority sequence; and a control means responsive to the first output signal and the second output signal for producing and selectively delivering control signals to the first and second group of control elements in a preselected sequence.

2. A demand controller according to claim 1 wherein said control elements are plug-in modular units and have a means for electrically connecting to an interconnecting electrical network.

3. A demand controller according to claim 2 wherein each of said control elements comprises a multiple connector switch connected to selectively change the connections to the interconnecting electrical network to provide selective connections betwen control elements in each priority group.

4. A demand controller according to claim 1 wherein said sensing means comprises a means for measuring the current in the power system to produce an output proportional to the current in the power system, a comparing means responsive to the measuring means output for producing a first signal when the measuring means output is above a first preselected level and for producing a second signal when it is below a second preselected level; and a time delay means responsive to the first and second signals for producing a corresponding first output signal and a second output signal in response to the receipt of the first signal and the second signal, respectively, after a preselected time interval.

5. A demand controller according to claim 1 wherein said control elements each have a means responsive to the receipt of an appropriate control signal for connecting or disconnecting its corresponding load and for producing an output for at least one other control element of the same group, and each have a means responsive to said control element outputs for changing conditions in preparation for receipt of a control signal.

6. A demand controller according to claim 5, wherein said control elements each have a means responsive to the receipt of an appropriate control signal for connecting or disconnecting its corresponding load and for producing one output for at least one other control element of the same group.

7. A demand controller for an electrical power system of the type connecting and disconnecting electrical loads from an electrical source to control the level of electrical power consumption comprising;

a means for measuring the current in the power system to produce an output varying as a function of the current;

a comparing means responsive to the measuring means output for producing a first signal when the measuring means output is above a first preselected level and a second signal when the measuring means output is below a second preselected level;

a time delay means responsive to the first and second signals for producing a corresponding shed signal and a restore signal in response to the receipt of the first signal and the second signal respectively after a preselected time interval;

a group of equal priority control elements each connected to respectively control each of a first group of loads and each having a means for producing an output indicating the connection or disconnection of its corresponding load and said group having a means responsive to shed control signals for disconnecting the first group of loads in an equal priority sequence and to restore control signals for connecting the first group of loads in an equal priority sequence;

a group of set priority control elements each connected to respectively control a second group of loads and each having a means for producing an output indicating the connection or disconnection of its corresponding load, said group having a means responsive to shed control signals for disconnecting the second group loads in a set priority sequence and responsive to restore control signals for connecting the second group of loads in a set priority sequence; and a control means responsive to the shed signal and the restore signal for producing corresponding shed control signals and restore control signals and for selectively delivering the control signals to the two groups of control elements in a preselected sequence.

* * * * *